United States Patent
Berry et al.

(10) Patent No.: US 11,187,091 B1
(45) Date of Patent: Nov. 30, 2021

(54) MAGNETIC SEALING ARRANGEMENT FOR A TURBOMACHINE

(71) Applicant: General Electric Company, Schenectady, NY (US)

(72) Inventors: Jonathan Dwight Berry, Simpsonville, SC (US); Michael John Hughes, State College, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/136,125

(22) Filed: Dec. 29, 2020

(51) Int. Cl.
| | | |
|---|---|---|
| *F01D 9/02* | (2006.01) | |
| *F16J 15/43* | (2006.01) | |
| *F01D 25/12* | (2006.01) | |

(52) U.S. Cl.
CPC ............. *F01D 9/023* (2013.01); *F16J 15/43* (2013.01); *F01D 25/12* (2013.01); *F05D 2240/55* (2013.01)

(58) Field of Classification Search
CPC ...... F01D 9/023; F01D 11/003; F01D 11/005; F01D 25/12; F16J 15/43; F05D 2240/55
See application file for complete search history.

(56) References Cited

U.S. PATENT DOCUMENTS

| | | | |
|---|---|---|---|
| 4,513,567 A | 4/1985 | Deveau et al. | |
| 6,152,685 A | 11/2000 | Hagi | |
| 6,220,602 B1 | 4/2001 | Webster et al. | |
| 6,450,762 B1 | 9/2002 | Munshi | |
| 6,877,952 B2 | 4/2005 | Wilson | |
| 7,249,769 B2* | 7/2007 | Webster | F01D 11/025 |
| | | | 277/410 |
| 8,038,155 B2* | 10/2011 | Zheng | F16J 15/3444 |
| | | | 277/378 |
| 9,360,118 B2 | 6/2016 | Fukuhara | |
| 9,771,821 B1* | 9/2017 | Mills | F16J 15/445 |
| 10,683,766 B2* | 6/2020 | Lang | F01D 11/005 |
| 10,865,653 B2* | 12/2020 | De La Bruere Terreault | |
| | | | F16J 15/3444 |
| 10,920,670 B2* | 2/2021 | Escudero Olano | F16J 15/46 |
| 2010/0327534 A1 | 12/2010 | Powar et al. | |
| 2020/0109644 A1* | 4/2020 | Pretty | F01D 25/24 |

FOREIGN PATENT DOCUMENTS

| | | |
|---|---|---|
| GB | 2108586 A | 5/1983 |
| JP | 3564286 B2 | 9/2004 |

* cited by examiner

*Primary Examiner* — Courtney D Heinle
*Assistant Examiner* — Sang K Kim
(74) *Attorney, Agent, or Firm* — Dority & Manning, P.A.

(57) ABSTRACT

Sealing arrangements and turbomachines are provided. A sealing arrangement includes a transition duct having an upstream end and a downstream end. The transition duct includes an aft frame that circumferentially surrounds the downstream end of the transition duct. A stage one nozzle is spaced apart from the aft frame and defines a gap therebetween. A sealing assembly extends across the gap and is magnetically coupled to both the aft frame and the stage one nozzle. The sealing assembly includes a first magnet coupled to the aft frame and a second magnet coupled to the stage one nozzle. The sealing assembly further includes a shell that is coupled to and at least partially surrounds the first magnet and the second magnet.

20 Claims, 4 Drawing Sheets

MAGNETIC SEALING ARRANGEMENT FOR A TURBOMACHINE

FIELD

The present disclosure relates generally to a combustion sealing arrangement for a gas turbine engine. More specifically, the application relates generally to magnetic seals for reduced leakage flow of turbine hot gas path components and the like.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of a gas turbine typically includes combustors that are coupled to a stage-one nozzle of the turbine section via transition ducts. Generally, each transition duct has an aft frame positioned adjacent to an inlet side of the turbine section. The aft frame will usually have two arcuate portions which are referred to as inner and outer portions, being inner and outer in the radial direction with respect to the centerline axis of the turbine. The inner and outer portions of the aft frame are interconnected by radially extending linear portions, often referred to as side portions. A sealing assembly is typically used to seal between the aft frame and the inlet of the turbine section. In particular, inner and outer circumferential seals are used to seal between the inner and outer portions of the aft frame and the corresponding inlet of the turbine section. Likewise, radially oriented side seals can be disposed between adjacent aft frames to substantially close and seal off the circumferential gaps between the side portion of one aft frame and the next aft frame.

The sealing assembly positioned about the aft frame generally functions to prevent high temperature combustion gases from being diluted with pressurized air surrounding the combustor prior to entrance into the turbine section. In this way, the sealing assembly ensures that the high temperature combustion gases are utilized fully in order to produce work within the turbine section.

However, issues exist with the use of many known sealing assemblies. For example, the high temperature of the combustion gases can cause damage to the sealing assembly over time, which may result in a limited life and decreased durability of the assembly. In addition, thermal expansion and vibrational movement of the aft frame and the stage one nozzle during operation of the gas turbine can cause the sealing assemblies to misalign and/or entirely decouple from, which results in an incomplete seal between the components.

Accordingly, an improved sealing assembly is desired in the art. In particular, an improved sealing assembly for a gas turbine engine that has increased durability and alignment, thereby prolonging the overall life and durability of the assembly, is desired.

BRIEF DESCRIPTION

Aspects and advantages of the sealing arrangements and turbomachines in accordance with the present disclosure will be set forth in part in the following description, or may be obvious from the description, or may be learned through practice of the technology.

In accordance with one embodiment, a sealing arrangement for a turbomachine is provided. The sealing arrangement includes a transition duct having an upstream end and a downstream end. The transition duct includes an aft frame that circumferentially surrounds the downstream end of the transition duct. A stage one nozzle is spaced apart from the aft frame and defines a gap therebetween. A sealing assembly extends across the gap and is magnetically coupled to both the aft frame and the stage one nozzle. The sealing arrangement includes a first magnet coupled to the aft frame and a second magnet coupled to the stage one nozzle. The sealing arrangement further includes a shell that is coupled to and at least partially surrounds between the first magnet and the second magnet.

In accordance with another embodiment, a turbomachine is provided. The turbomachine includes a compressor section. The turbomachine also includes a combustor section having a plurality of combustors. Each combustor includes a transition duct having an upstream end and a downstream end. Each transition duct includes an aft frame that circumferentially surrounds the downstream end of the transition duct. The turbomachine also includes a turbine section having a stage one nozzle spaced apart from the aft frame. A gap is defined between the stage one nozzle and the aft frame. A sealing assembly extends across the gap and is magnetically coupled to both the aft frame and the stage one nozzle. The sealing arrangement includes a first magnet coupled to the aft frame and a second magnet coupled to the stage one nozzle. The sealing arrangement further includes a shell that is coupled to at least partially surrounds the first magnet and the second magnet.

These and other features, aspects and advantages of the present sealing arrangements and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and turbomachines, including the best mode of making and using the present systems and methods, directed to one of ordinary skill in the art, is set forth in the specification, which makes reference to the appended figures, in which.

DETAILED DESCRIPTION

Figure 1:
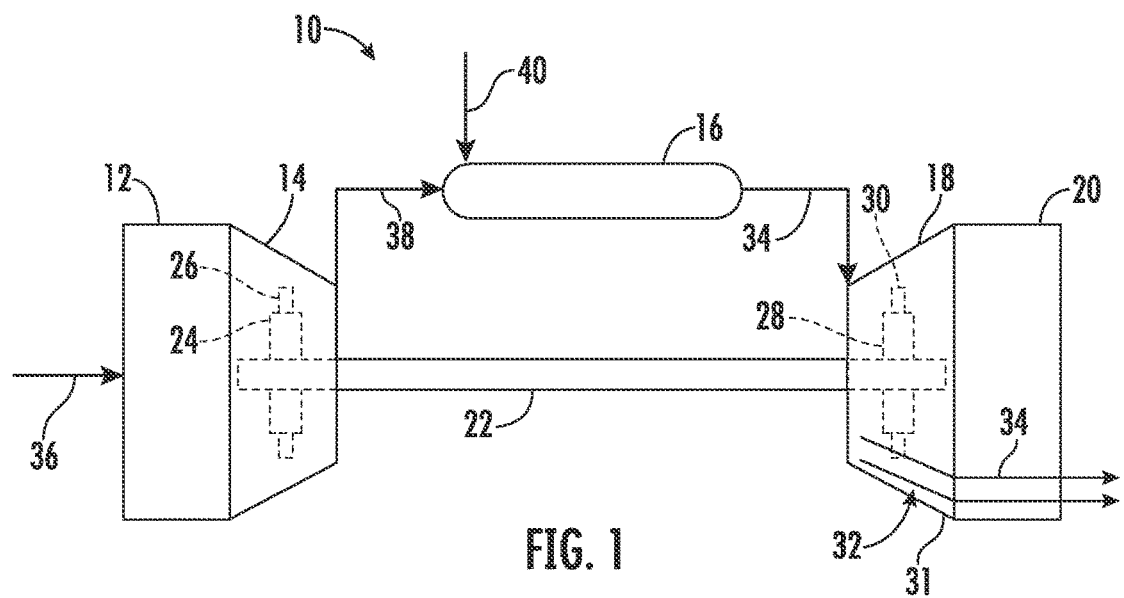
FIG. 1 is a schematic illustration of a turbomachine in accordance with embodiments of the present disclosure.

Reference now will be made in detail to embodiments of the present sealing arrangements and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 36 flows through the inlet section 12 and into the compressor section 14 where the air 36 is progressively compressed, thus providing pressurized air or compressed air 38 to the combustors 17 (FIG. 2) of the combustor section 16. The compressed air 38 is mixed with fuel 40 and burned within each combustor 17 (FIG. 2) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
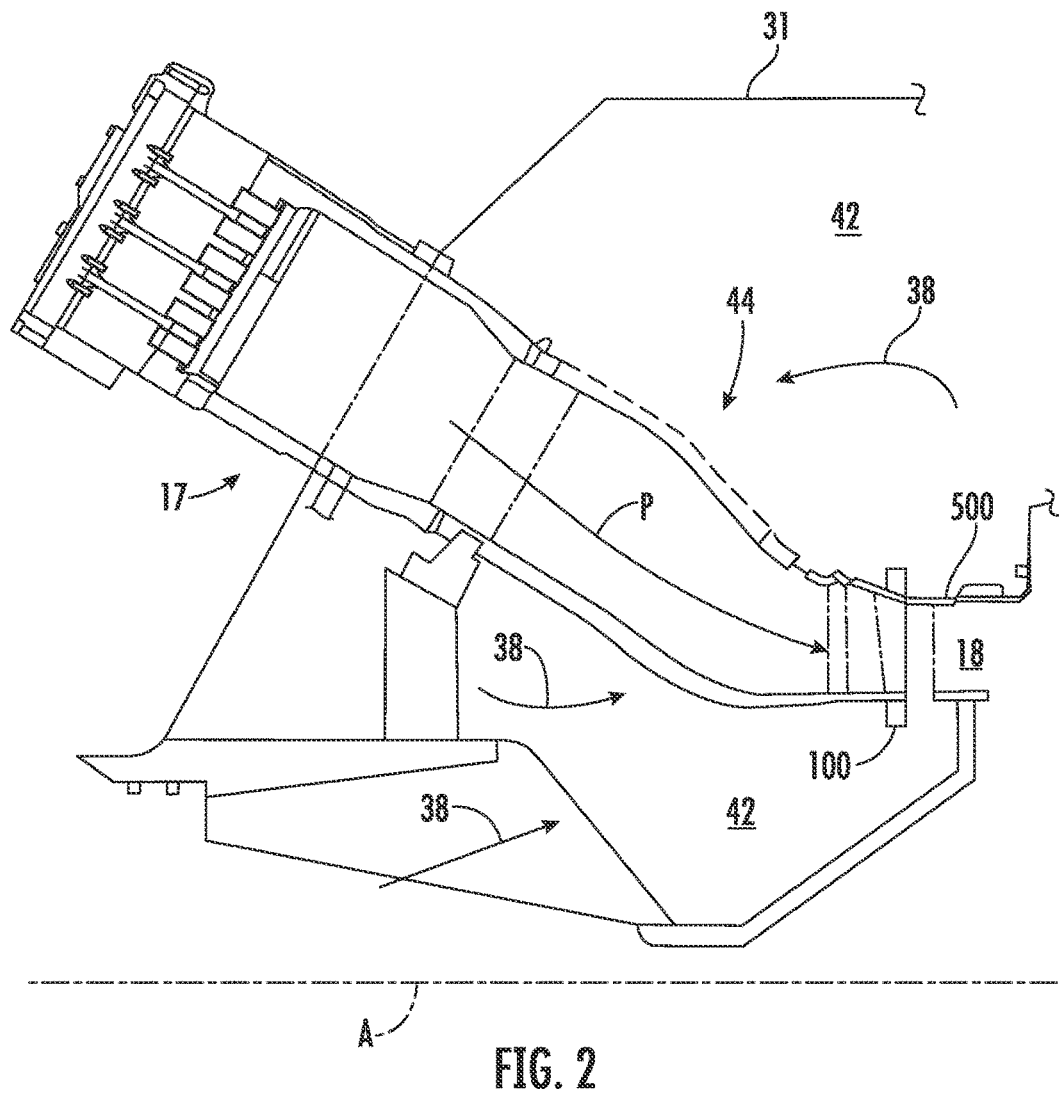
FIG. 2 illustrates a section view of a combustor in accordance with embodiments of the present disclosure.

As shown in FIG. 2, a combustor 17 may be at least partially surrounded by an outer casing 31 such as a compressor discharge casing. The outer casing 31 may at least partially define a high-pressure plenum 42 that at least partially surrounds various components of the combustor 17, such as transition duct 44. The high-pressure plenum 42 may be in fluid communication with the compressor 14 (FIG. 1) so as to receive the compressed air 38 therefrom. As illustrated in FIG. 2, the combustor 17 may be connected to a stage-one nozzle 500 of turbine 18 via a transition duct 44 including an aft frame 100. The transition duct 44 defines a flow path P. Also shown in FIG. 2 is the central axis A of turbine 18, which defines an axial direction substantially parallel to and/or along axis A, a radial direction R (FIG. 3) perpendicular to axis A, and a circumferential direction C (FIG. 3) extending around axis A.

Figure 3:
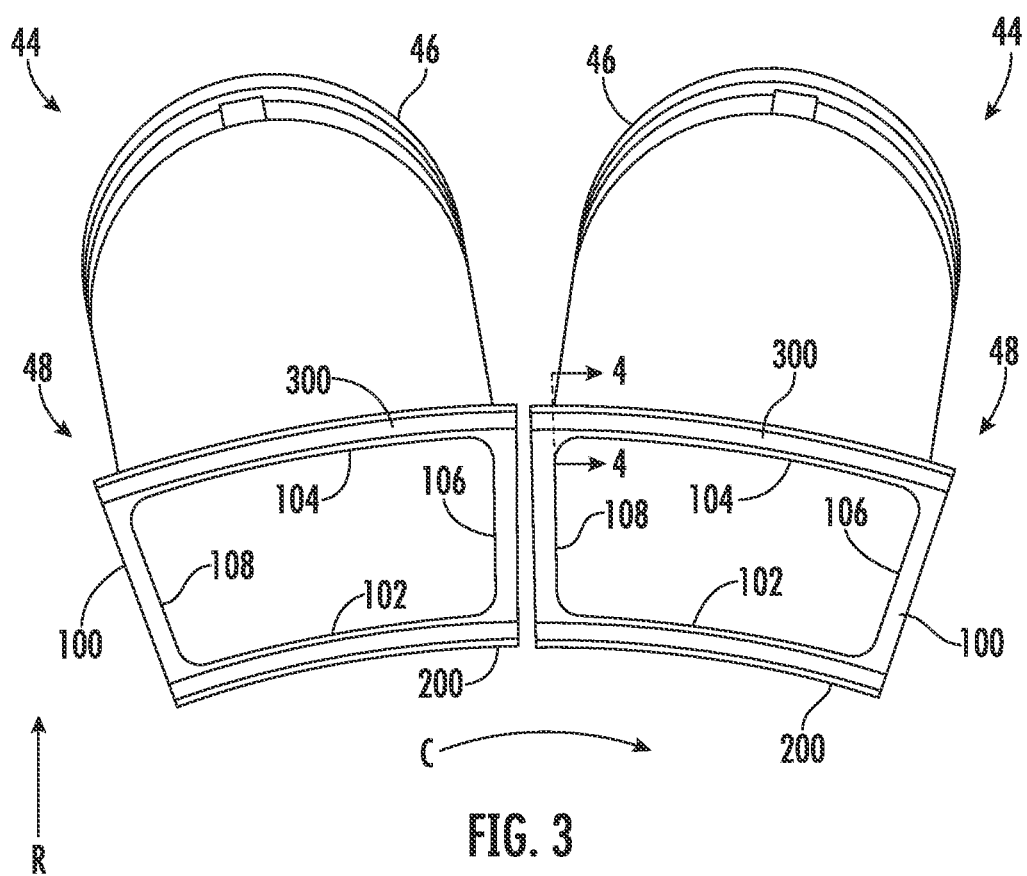
FIG. 3 illustrates a perspective view of circumferentially adjacent transition ducts in accordance with embodiments of the present disclosure.
Figure 4:
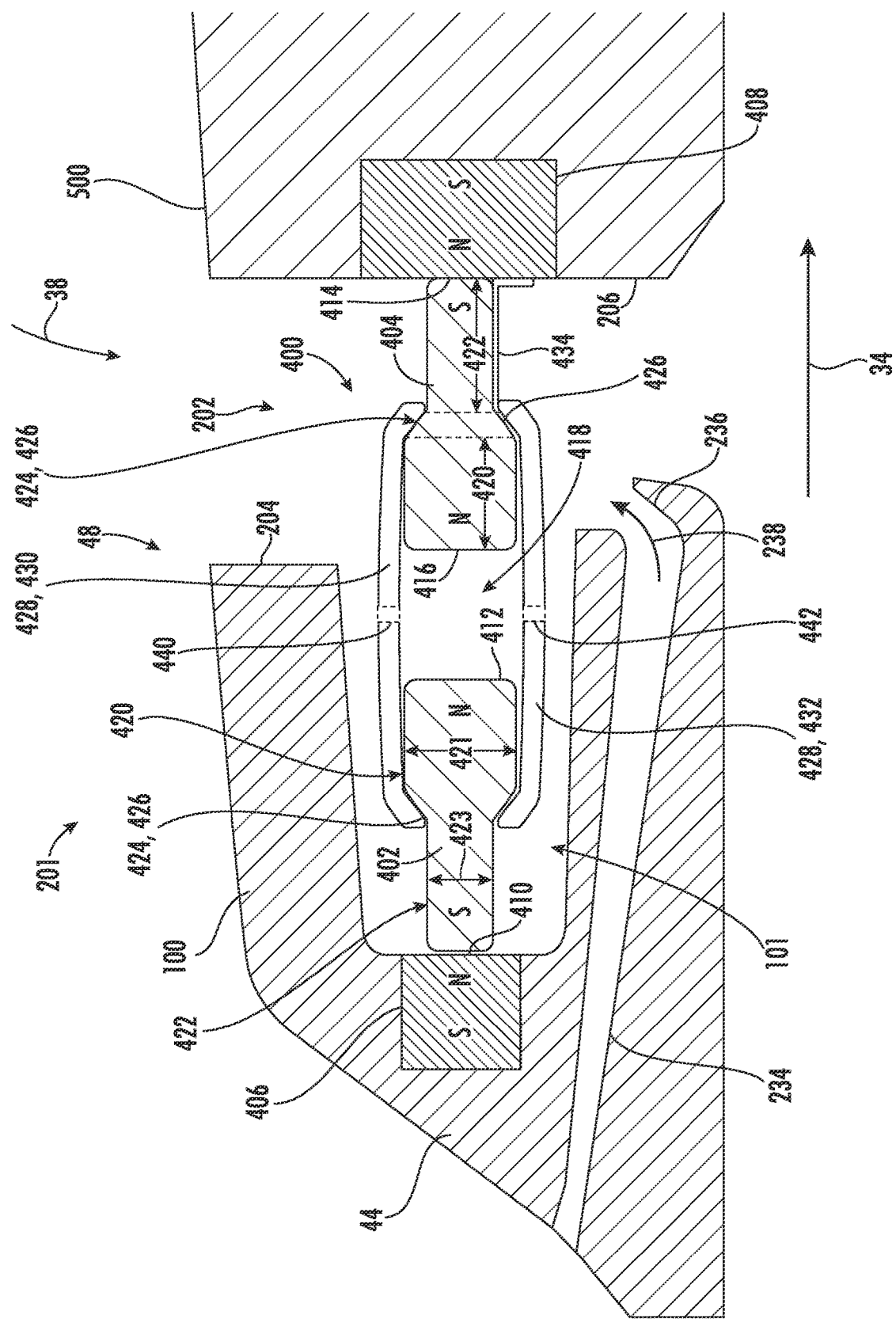
FIG. 4 illustrates a cross sectional view of a sealing arrangement in accordance with embodiments of the present disclosure.

Referring now to FIG. 3, a pair of circumferentially arranged transition ducts 44 are illustrated, each having an upstream end 46 and a downstream end 48. As shown, an aft frame 100 surrounds the respective downstream end 48 of the transition ducts 44. As illustrated in FIG. 3, in some embodiments, the aft frame 100 may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. Aft frame 100 may include a notch or slot 101 (as shown in FIG. 4 for receiving inner seal 200 and/or outer seal 300. In some embodiments, a notch 101 may extend fully around the perimeter of the aft frame 100 (e.g., notch 101 may be continuous through the side portions 106 and 108 and the inner and the outer portions 102 and 104) for receiving both inner seal 200 and outer seal 300 as well as a radially-oriented side seal (not shown) which may be provided between adjacent aft frames 100. It is also possible in some embodiments to provide separate slots or notches for each of the seals 200, 300, and 400.

As shown in FIG. 3, inner seal 200 and outer seal 300 may be circumferentially oriented with respect to a circumferential direction C of the gas turbine 10. For example, each inner seal 200 is circumferentially aligned with the other inner seal 200 on the adjacent aft frame 100, and each outer seal 300 is circumferentially aligned with the other outer seal 300 on the adjacent aft frame 100. Thus, inner seals 200 and outer seals 300 may be collectively referred to as circumferentially oriented seals.

In the description herein, certain features of the aft frame 100, stage-one nozzle 500, and seals 200 and 300, will be described with reference to one or the other of inner portion 102/inner seal 200 and outer portion 104/outer seal 300, nonetheless, it will be recognized by one of ordinary skill in the art that such features can be associated with either or both of inner portions 102 and/or outer portions 104.

FIG. 4 illustrates a cross-sectional view of an exemplary sealing arrangement 201 in accordance with embodiments of the present disclosure. As shown in FIG. 4, the sealing arrangement 201 includes a transition duct 44 having an upstream end 46 and a downstream end 48 (As shown in FIG. 3). In many embodiments, an aft frame 100 circumferentially surrounds the downstream end 48 of the transition duct 44. A stage one nozzle 500 of turbine 18 may be spaced apart from the aft frame 100 and may define a gap 202 between the stage one nozzle 500 and the aft frame 100. Specifically, the stage one nozzle 500 and the aft frame 100 may be axially spaced apart to allow for movement and/or thermal expansion of the stage one nozzle 500 and/or the aft frame 100 during operation of the gas turbine 10. The gap 202 may be defined axially between an aft face 204 of the aft frame 100 and a forward face 206 of the stage one nozzle 500.

As shown in FIG. 4, the sealing arrangement 201 may further include a sealing assembly 400 that extends across the gap 202, in order to prevent combustion gases 34 exiting the transition duct 44 from being diluted with pressurized air 38 surrounding the combustor 17 prior to entrance into the turbine section 18. In various embodiments, the sealing assembly 400 may be an inner seal 200, an outer seal 300, or both an inner seal 200 and an outer seal 300. In exemplary embodiments, the sealing assembly may include a first magnet 402 coupled to the aft frame 100, a second magnet 404 coupled to the stage one nozzle 500, and a shell 428 coupled to the first magnet 402 and the second magnet 404.

As shown in FIG. 4, the sealing arrangement may include a first magnet 402 and a second magnet 404. The first magnet 402 may be magnetically coupled to the aft frame 100 via an attractive magnetic force, and the second magnet 404 may be magnetically coupled to the stage one nozzle 500 via an attractive magnetic force.

For example, in some embodiments, the aft frame 100 and/or the stage one nozzle 500 may be formed of a ferrous (or iron containing) metal, such that the aft frame 100 and/or the stage one nozzle 500 are attracted to the magnets 402, 404 and coupled thereto. In other embodiments, the aft frame 100 and/or the stage one nozzle 700 may be formed of a non-ferrous metal, such that they are not impacted by magnetic forces. In such embodiments, as shown in FIG. 4, the sealing arrangement 201 may further include a third magnet 406 embedded within the aft frame 100, and a fourth magnet 408 embedded within the stage one nozzle 500. As shown, the first magnet 402 may be magnetically coupled to the third magnet 406, and the second magnet 404 may be magnetically coupled to the fourth magnet 408.

In many embodiments, the magnets 402, 404, 406, 408 may each include a first pole or north pole N and a second pole or south pole S. As is generally understood by those of skill in the art, the ends of a permanent magnet (such as the magnets 402, 404, 406, 408 described herein), are called its poles. One end is called the north pole, the other is called the south pole. If two magnets are oriented such the south pole of one faces the north pole of the other, the magnets will exhibit a force that pulls the magnets toward one other. Similarly, if two magnets are oriented such that two like poles are facing one another, the magnets will exhibit a force that repels the magnets away from one another. Although the magnets 402, 404, 406, 408 are shown in FIG. 4 as having the poles labeled on specific ends, it is envisioned to be within the scope of the present disclosure that each of the poles may be switched, thereby yielding the same configuration but with an opposite magnetic pole orientation.

In many embodiments, each of the magnets 402, 404, 406, 408 may be in the form of a piece of metal material that has its component atoms so ordered that the material exhibits properties of magnetism, such as attracting other iron-containing objects or aligning itself in an external magnetic field. In exemplary embodiments, the magnets 402, 404, 406, 408 may be Alnico magnets, such that they are permanent magnets that are primarily made up of a combination of aluminum, nickel, and cobalt but may also include copper, iron and titanium. Alnico magnets may be capable of operation in extremely high temperatures, such as upwards of 1000° F.

As shown in FIG. 4, The first magnet 402 may extend generally axially from a first end 410 that is magnetically coupled to the aft frame 100 to a second free end 412. The first end 410 of the first magnet 402 may be magnetically coupled to the third magnet 406, such that the first end 410 of the first magnet 402 directly contacts the third magnet 406 and is attracted thereto via an attractive magnetic force. For example, as shown in FIG. 4, the first end 410 of the first magnet 402 may be the south pole S, which may be attracted to the north pole N of the third magnet 406. Similarly, the second magnet 404 may extend generally axially from a first end 414 that is magnetically coupled to the stage one nozzle 500 to a second free end 416. The first end 414 of the second magnet 404 may be magnetically coupled to the fourth magnet 408, such that the first end 414 of the second magnet 404 directly contacts the fourth magnet 408 and is attracted thereto via an attractive magnetic force. For example, as shown in FIG. 4, the first end 414 of the second magnet 404 may be the south pole S, which may be attracted to the north pole N of the fourth magnet 408.

As shown in FIG. 4 the first magnet 402 and the second magnet 404 may be axially separated from each other, such that there is an axial gap 418 defined between the first magnet 402 and the second magnet 404. Specifically, the axial gap 418 may be defined between the second free end 412 of the first magnet 402 and the second free end 416 of the second magnet 404.

In exemplary embodiments, the first magnet 402 may face the second magnet 404 such that a repulsive magnetic force repels the first magnet 402 and the second magnet 404 away from one another in an axial direction A. For example, the second free ends 414 and 416 of each of the respective magnets 402 and 404 may have like poles, thereby exhibiting a repulsive force on one another. For example, as shown in FIG. 4, both the second free end 412 of the first magnet 402 and the second free end 416 of the second magnet may face one another and may both be the north pole N, thereby producing a repelling force between one another.

In many embodiments, the first magnet 402 and the second magnet 404 may each include a first portion 422 and a second portion 420. The first portion 422 may extend between the respective first ends 410, 414 and a respective transition segment 424 disposed between the first portion 422 and the second portion 420. Likewise, each of the second portions 422 may extend from the respective transition segments 424 to the respective second free ends 412, 416. As shown, the first portion 422 may define a first width 423 and the second portion 420 may define a second width 421. As shown in FIG. 4, the second width 421 may be larger than the first width 423, such that the transition segment 424 defines a groove 426 disposed between the first portion 422 and the second portion 420 of the magnets 402, 404. For example, the magnets 402, 404 may taper from the first width 423 to the second width 421, such that the groove 426 is defined on both the radially inner side and the radially outer side of the magnets 402, 404.

In various embodiments, a shell 428 may be coupled to and at least partially surrounding the first magnet 402 and the second magnet 404. In many embodiments, the shell 428 may extend between the first magnet 402 and the second magnet 404, in order for the sealing assembly 400 to completely cover the gap 202 and the axial gap 418, thereby preventing the combustion gases 34 from being diluted with pressurized air 38 surrounding the combustor 17 prior to entrance into the turbine section 18. As shown in FIG. 4, the shell 428 may include a radially outer portion 430 and a radially inner portion 432. Although the embodiment in FIG. 4 is shown having both a radially outer portion 430 and a radially inner portion 432 of the shell 428, in other embodiments (not shown), the shell 428 may only include a radially inner portion 430 or only a radially outer portion 432.

The radially outer portion 430 of the shell 428 may couple to the groove 426 of the first magnet 402 and the groove 426 of the second magnet 404 on the radially outer side of the magnets 402, 404. Similarly, the radially inner portion 432 of the shell 428 may couple to the groove 426 of the first magnet 402 and the groove 426 of the second magnet 404 on the radially inner side of the magnets 402, 404. In some embodiments, the shell 428 may be slidably coupled to the first magnet 402 and the second magnet 404, such that axial movement of the aft frame 100 and or stage one nozzle 500 would result in the shell 428 sliding in the axial direction relative to the first magnet 402 and the second magnet 404. In other embodiments, the shell 428 may be fixedly coupled to the first magnet 402 and the second magnet 404, such that axial movement of the aft frame 100 and the stage one nozzle 500 would result in the shell 428 bending and/or flexing.

In various embodiments, the shell 428 may be composed of a flexible sealing element, such as a metallic cloth material. For example, the flexible sealing element may be a woven mesh cloth of a suitable metal material, e.g., alloy L605. The materials of the flexible sealing element may be layered, e.g., a single sheet of cloth material, may be folded over on itself, and/or multiple layers of cloth material may be welded together.

In particular embodiments, the sealing assembly 400 may further include a heat shield 434. As shown in FIG. 4, the heat shield 434 may extend axially from the groove 426 on the radially inner side of the second magnet 404 to the stage one nozzle 500. In various embodiments, the heat shield 434 may be positioned at least partially radially between the radially inner portion 432 of the shell 428 and the second magnet 404. The heat shield 434 may function to advantageously prevent combustion gases 34 exiting the aft frame 100 from causing thermal damage to magnets 402, 404. For example, the heat shield 434 creates an additional barrier between the high temperature combustion gases 34 and the magnets 402, 404, which prolongs the life and durability of the magnets 402, 404.

In some embodiments, the shell 428 may define one or more cooling holes 440, 442. For example, a cooling hole 440 may be defined within the radially outer portion 430 of the shell 428, and a cooling hole 442 may be defined within the radially inner portion 432. The cooling holes 440, 442 may function to allow a small portion of the pressurized air 38 to flow therethrough and cool the various components of the sealing assembly 400, such as the first magnet 402, the second magnet 404, the shell 428, and/or other components.

As shown in FIG. 4, the aft frame 100 may define a slot 101 that extends axially and circumferentially within the aft frame 100 with respect to the axial centerline of the gas turbine 10. In many embodiments, at least a portion of the sealing assembly 400 extends into the slot 101 defined by the aft frame 100, which advantageously shields the sealing assembly from the high temperature combustion gases 34.

In various embodiments, the aft frame 100 may define a cooling channel 234 that functions to cool various components of the sealing arrangement 201. As shown, the cooling channel 234 may extend along the aft frame 100. In many embodiments, the cooling channel 236 may diverge radially inward towards the axial centerline A of the gas turbine 10 in the direction of combustion gas 34 flow within the aft frame 100 (from upstream end to downstream end). The cooling channel 234 may further include an outlet 236. The outlet 236 may be oriented generally radially, in order to direct a flow of cooling air 238 towards the sealing assembly 400. The flow of cooling air 238 may provide for impingement cooling to the various components of the sealing assembly 400, such as the first magnet 402, the second magnet 404, the shell 428, and/or other components. The flow of cooling air 238 may ensure that the various magnets 402, 404 within the sealing assembly 400 maintain an operable temperature, i.e., ensure that the magnets 402, 404 do not overheat.

Figure 5:
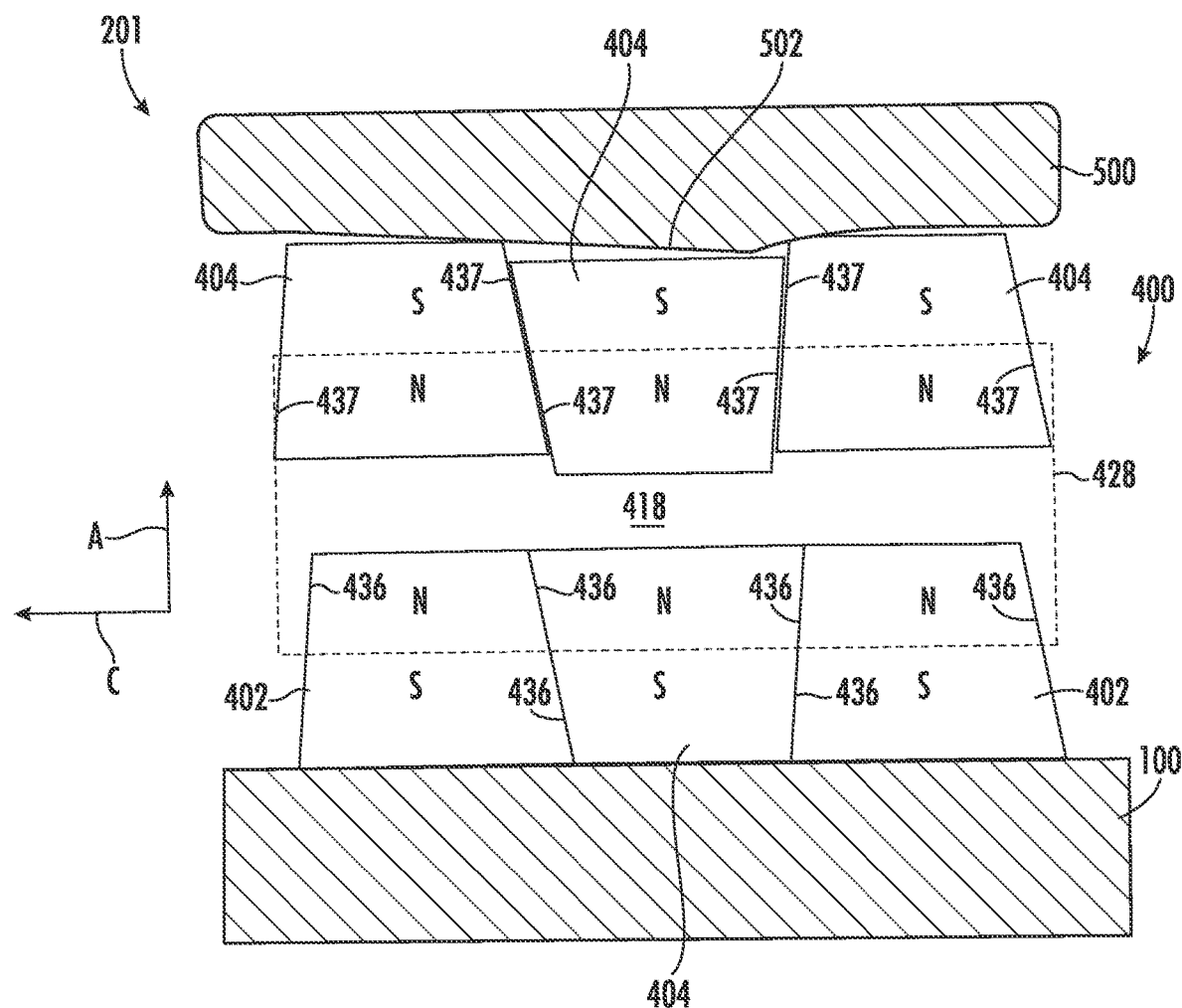
FIG. 5 illustrates a view of a sealing arrangement from along a radial direction, in accordance with embodiments of the present disclosure.

FIG. 5 illustrates a view of a sealing arrangement from along a radial direction R, in which the shell 428 is shown as a dashed line, in accordance with embodiments of the present disclosure. As shown in FIG. 5, the first magnet 402 may be a plurality of first magnets 402 circumferentially neighboring each other along the aft frame 100. For example, each first magnet 402 may be positioned between, and capable of relative movement to, two neighboring first magnets 402. Similarly, the second magnet 404 may be a plurality of second magnets 404 circumferentially neighboring each other along the stage one nozzle. For example, each second magnet 404 of the plurality of second magnets 404 may be positioned between, and capable of relative movement to, two neighboring second magnets 404. Including a plurality of first magnets 402 and second magnets 404 as shown in FIG. 5 allows the sealing assembly 400 to attach to a non-flat surface, i.e. surfaces that include protrusions, bumps, or contours. For example, as shown, the stage one nozzle 500 may include a contour 502, and the plurality of second magnets 404 may adjust and move relative to one another to couple to the surface of the stage one nozzle 500.

In particular embodiments, the plurality of first magnets 402 and the plurality of second magnets 404 may each comprise a trapezoidal cross-sectional shape. For example, the plurality of first magnets 402 may be arranged such that the trapezoidal cross-sectional shape alternates in orientation. That is, as shown, each of the first magnets 402 may include sides 436 that taper in the axial direction A, e.g., the first magnets 402 may taper such that they increase in circumferential width in the axial direction A or decrease in circumferential width in the axial direction A. Alternatively or additionally, in other embodiments (not shown), the sides 436 of the first magnets 402 may taper in the radial direction R, such that the first magnets 402 increase in circumferential width in the radial direction R or decrease in circumferential width in the radial direction R.

In many embodiments, a first magnet 402 that includes sides 436 that taper in a first direction (either increasing in width or decreasing in width) may be immediately neighboring, and in contact with, two other first magnets 402 having sides 436 that taper in a second direction that is opposite the first direction. Arranging the plurality of first magnets 402 in this way advantageously limits the relative movement between the magnets 402 and prevents them from moving too far and causing a misalignment of the sealing assembly 400.

Similarly, the plurality of second magnets 404 may be arranged such that the trapezoidal cross-sectional shape alternates in orientation. That is, each of the second magnets 404 may include sides 437 that taper in the axial direction A, e.g., the second magnets 404 may taper such that they increase in circumferential width in the axial direction A or decrease in circumferential width in the axial direction A. Alternatively or additionally, in other embodiments (not shown), the sides 437 of the second magnets 404 may taper in the radial direction R, such that the first magnets 404 increase in circumferential width in the radial direction R or decrease in circumferential width in the radial direction R.

In many embodiments, a second magnet 404 that includes sides 437 that taper in a first direction (either increasing in width or decreasing in width) may be immediately neighboring, and in contact with, two other second magnets 404 having sides 437 that taper in a second direction that is opposite the first direction. Arranging the plurality of second magnets 404 in this way advantageously limits the relative movement between the magnets 404 and prevents them from moving too far and causing a misalignment of the sealing assembly 400.

In many embodiments, the sealing assembly 400 may extend continuously in the circumferential direction C. In such embodiments, the shell 428 may extend continuously in the circumferential direction (into and out of the page in FIG. 4, such that the combustion gases 34 are prevented from being diluted 360 degrees around the gas turbine 10.

In operation, combustion gases 34 may exit the combustor 17 via the aft frame 100 and have to traverse across the gap 202 prior to entrance into the turbine section 18 via the stage one nozzle 500. The sealing assembly 400 described herein may ensure that no combustion gases 34 escape before entering the turbine section. In this way, the sealing assembly 400 ensures that all of the thermal energy from the combustion gases 34 gets received and utilized by the turbine. The arrangement of the magnets 402, 404, 406, 408 described herein advantageously allows for relative movement between the aft frame 100 and the stage one nozzle 500 while maintaining a proper seal across the gap 202. For example, the sealing assembly 400 described herein is capable of moving and rotating along with the aft frame 100 and stage one nozzle 500, while the magnets 402, 404, 406, 408 ensure that the sealing assembly 400 maintains alignment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for a turbomachine, comprising:
   a transition duct having an upstream end and a downstream end, the transition duct comprising an aft frame that circumferentially surrounds the downstream end of the transition duct;
   a stage one nozzle spaced apart from the aft frame and defining a gap therebetween; and
   a sealing assembly extending across the gap and magnetically coupled to both the aft frame and the stage one nozzle, the sealing assembly comprising:
   a first magnet coupled to the aft frame;
   a second magnet coupled to the stage one nozzle; and
   a shell coupled to and at least partially surrounding the first magnet and the second magnet.

2. The sealing arrangement as in claim 1, wherein a third magnet is embedded in the aft frame and a fourth magnet is embedded in the stage one nozzle, wherein the first magnet is magnetically coupled to the third magnet, and wherein the second magnet is magnetically coupled to the fourth magnet.

3. The sealing arrangement as in claim 1, wherein the first magnet and the second magnet are spaced apart from one another such that an axial gap is defined therebetween.

4. The sealing arrangement as in claim 1, wherein the first magnet faces the second magnet such that a repulsive magnetic force repels the first magnet and the second magnet away from one another in an axial direction.

5. The sealing arrangement as in claim 1, wherein the first magnet and the second magnet each include a first portion and a second portion, the first portion having a first width and the second portion having a second width, and wherein the second width is greater than the first width.

6. The sealing arrangement as in claim 5, wherein the first magnet and the second magnet each define a groove at a respective transition segment disposed between the respective first portion and the respective second portion, and wherein the shell is coupled to both the groove of the first magnet and the groove of the second magnet.

7. The sealing arrangement as in claim 1, wherein the shell comprises a radially outer portion and radially inner portion.

8. The sealing arrangement as in claim 1, further comprising a heat shield.

9. The sealing arrangement as in claim 1, wherein the first magnet is a plurality of first magnets circumferentially neighboring each other along the aft frame, and wherein the second magnet is a plurality of second magnets circumferentially neighboring each other along the stage one nozzle.

10. The sealing arrangement as in claim 9, wherein the plurality of first magnets and the plurality of second magnets each comprise a trapezoidal cross-sectional shape.

11. A turbomachine, comprising:
a compressor section;
a combustor section having a plurality of combustors, each combustor comprising a transition duct having an upstream end and a downstream end, the transition duct comprising an aft frame that circumferentially surrounds the downstream end of the transition duct;
a turbine section having a stage one nozzle spaced apart from the aft frame, wherein a gap is defined between the stage one nozzle and the aft frame;
a sealing assembly extending across the gap and magnetically coupled to both the aft frame and the stage one nozzle, the sealing assembly comprising:
a first magnet coupled to the aft frame;
a second magnet coupled to the stage one nozzle; and
a shell coupled to and at least partially surrounding the first magnet and the second magnet.

12. The turbomachine as in claim 11, wherein a third magnet is embedded in the aft frame and a fourth magnet is embedded in the stage one nozzle, wherein the first magnet is magnetically coupled to the third magnet, and wherein the second magnet is magnetically coupled to the fourth magnet.

13. The turbomachine as in claim 11, wherein the first magnet and the second magnet are spaced apart from one another such that an axial gap is defined therebetween.

14. The turbomachine as in claim 11, wherein the first magnet faces the second magnet such that a repulsive magnetic force repels the first magnet and the second magnet away from one another in an axial direction.

15. The turbomachine as in claim 11, wherein the first magnet and the second magnet each include a first portion and a second portion, the first portion having a first width and the second portion having a second width, and wherein the second width is greater than the first width.

16. The turbomachine as in claim 15, wherein the first magnet and the second magnet each define a groove at a respective transition segment disposed between the respective first portion and the respective second portion, and wherein the shell is coupled to both the groove of the first magnet and the groove of the second magnet.

17. The turbomachine as in claim 11, wherein the shell comprises a radially outer portion and radially inner portion.

18. The turbomachine as in claim 11, further comprising a heat shield.

19. The turbomachine as in claim 11, wherein the first magnet is a plurality of first magnets circumferentially neighboring each other along the aft frame, and wherein the second magnet is a plurality of second magnets circumferentially neighboring each other along the stage one nozzle.

20. The turbomachine as in claim 19, wherein the plurality of first magnets and the plurality of second magnets each comprise a trapezoidal cross-sectional shape.

* * * * *